(12) United States Patent
Iida

(10) Patent No.: US 7,866,152 B2
(45) Date of Patent: Jan. 11, 2011

(54) HYDROSTATIC TRANSAXLE

(75) Inventor: Masaru Iida, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 173 days.

(21) Appl. No.: 12/353,712

(22) Filed: Jan. 14, 2009

(65) Prior Publication Data

US 2009/0120709 A1    May 14, 2009

Related U.S. Application Data

(63) Continuation of application No. 11/486,072, filed on Jul. 14, 2006, now Pat. No. 7,487,635.

(30) Foreign Application Priority Data

Jul. 15, 2005   (JP)   ............................. 2005-207370

(51) Int. Cl.
*F16D 31/02* (2006.01)
(52) U.S. Cl. ...................................................... 60/487
(58) Field of Classification Search ........................ None
See application file for complete search history.

(56) References Cited

U.S. PATENT DOCUMENTS

| 488,681 | A | | 12/1892 | Scholfield | |
| 1,233,084 | A | | 7/1917 | McMurray | |
| 4,580,460 | A | | 4/1986 | Chang et al. | |
| 5,203,169 | A | * | 4/1993 | Ishii et al. | 60/487 |
| 5,377,487 | A | * | 1/1995 | Azuma et al. | 60/487 |
| 5,394,699 | A | * | 3/1995 | Matsufuji | 60/487 |
| 5,438,831 | A | * | 8/1995 | Okada | 60/487 |
| 6,385,971 | B1 | | 5/2002 | Abend et al. | |
| 6,758,112 | B2 | | 7/2004 | Ishii et al. | |

* cited by examiner

*Primary Examiner*—F. Daniel Lopez
(74) *Attorney, Agent, or Firm*—Sterne, Kessler, Goldstein & Fox P.L.L.C.

(57) ABSTRACT

In a housing of a hydrostatic transaxle, an HST including mutually fluidly connected hydraulic pump and motor, an axle, and a deceleration gear train interposed between the hydraulic motor and the axle are disposed. The deceleration gear train includes an L-shaped counter shaft. The L-shaped counter shaft consists of mutually perpendicular first and second shaft portions. The first shaft portion is disposed in parallel to a motor shaft of the hydraulic motor. The second shaft portion is disposed in parallel to the axle. A first gear fitted on the motor shaft meshes with a second gear fitted on the first shaft portion. A third gear fitted on the second shaft portion meshes with a fourth gear fitted on the axle.

5 Claims, 11 Drawing Sheets

HYDROSTATIC TRANSAXLE

CROSS REFERENCE TO RELATED APPLICATION

This application is a continuation of U.S. application Ser. No. 11/486,072, filed Jul. 14, 2006, now pending, which is hereby incorporated by reference in its entirety.

BACKGROUND OF THE INVENTION

1. Field of the Invention

The invention relates to a hydrostatic transaxle whose housing incorporates a hydrostatic transmission (hereinafter referred to as "HST") including mutually fluidly connected hydraulic pump and motor, a horizontal axle, and a deceleration gear train drivingly connecting the hydraulic motor to the axle.

2. Related Art

Conventionally, as disclosed in U.S. Pat. No. 6,385,971, there is a well-known pair of hydrostatic transaxles for driving respective left and right axles, wherein a housing of each of the transaxles incorporates an HST including mutually fluidly connected hydraulic pump and motor, each of left and right axles, and a deceleration gear train drivingly connecting the hydraulic motor to the corresponding axle.

The reference discloses an embodiment in which the hydraulic motor includes a vertical motor shaft drivingly connected to the axle through mutually meshing gears. More specifically, the hydraulic motor is vertically mounted on a top surface of a flat plate-shaped center section, the motor shaft is extended downward from the center section, and a bevel gear fixed on the downwardly extended portion of the motor shaft meshes with another bevel gear constituting the deceleration gear train. This arrangement of the vertical motor shaft is advantageous for horizontally (e.g., laterally) minimizing the hydrostatic transaxle.

However, the hydrostatic transaxle including the vertical motor shaft disclosed in the reference requires a large space below the center section for the bevel gears, such as to vertically expand the transaxle.

SUMMARY OF THE INVENTION

An object of the invention is to provide a hydrostatic transaxle whose housing incorporates an HST including mutually fluidly connected hydraulic pump and motor, a horizontal axle, and a deceleration gear train drivingly connecting the hydraulic motor to the axle, wherein, while a motor shaft of the hydraulic motor is disposed perpendicular to the axle (e.g., vertically), the hydrostatic transaxle is advantageously minimized in the axial direction of the motor shaft.

To achieve the object, a hydrostatic transaxle according to the invention comprises: a hydrostatic transmission including mutually fluidly connected hydraulic pump and motor; an axle; a deceleration gear train drivingly connecting the hydraulic motor to the axle; and a housing incorporating the hydrostatic transmission, the axle and the deceleration gear train. A motor shaft of the hydraulic motor is extended perpendicular to the axle. An L-shaped counter shaft belongs to the deceleration gear train. A first shaft portion and a second shaft portion are disposed perpendicular to each other are joined to each other so as to constitute the L-shaped counter shaft. The first shaft portion is disposed in parallel to the motor shaft, and the second shaft portion is disposed in parallel to the axle. A first gear is fitted on the motor shaft. A second gear is fitted on the first shaft portion so as to mesh with the first gear. A third gear is fitted on the second shaft portion. A fourth gear is fitted on the axle so as to mesh with the third gear.

Therefore, the first and second gears can be horizontally flat (spur) gears so as to minimize a space for meshing gears to the deceleration gear train (the second shaft portion of the L-shaped counter shaft) in the axial direction of the motor shaft (e.g., vertically). Further, due to the L-shaped counter shaft, the third gear meshing with the fourth gear fitted on the axle can be disposed at an appropriate height, so that the hydraulic motor with the motor shaft can overlap the axle and the fourth gear fitted on the axle in the axial direction of the motor shaft (e.g., vertically), thereby minimizing the hydrostatic transaxle.

Preferably, the hydrostatic transaxle further comprises: a fifth bevel gear fitted on the first shaft portion of the L-shaped counter shaft; and a sixth bevel gear fitted on the second shaft portion of the L-shaped counter shaft so as to mesh with the fifth bevel gear. Therefore, the second and third gears fitted on the respective first and second shaft portions of the L-shaped counter shaft are drivingly connected to each other through the mutually meshing fifth and sixth bevel gears.

Preferably, the hydrostatic transaxle further comprises: a block fixed in the housing so as to support one end of the first shaft portion and one end of the second shaft portion joined to each other. The other end of the first shaft and the other end of the second shaft are supported by the housing. Therefore, the L-shaped counter shaft can be surely supported in the housing. The only required thing for the housing to join the ends of the first and second shaft portions through the block is processing of the housing for supporting the block. That is, the housing does not have to be complicatedly processed for supporting the joined ends of the L-shaped counter shaft.

Preferably, the hydraulic pump includes a pump shaft disposed in parallel to the motor shaft, and the hydraulic pump and the hydraulic motor are juxtaposed in the axial direction of the axle. Therefore, the hydrostatic transaxle can be minimized perpendicular to the axle and the motor shaft (in the fore-and-aft direction of the vehicle when the axle is disposed laterally horizontally and the motor shaft is disposed vertically).

Preferably, the hydraulic pump, whose pump shaft is disposed in parallel to the motor shaft, includes a displacement controlling operation shaft disposed between the pump shaft and the axle in the direction perpendicular to the axle. Therefore, the displacement controlling operation shaft is disposed in a dead space between the hydraulic pump and the axle, for instance, so as to minimize the hydrostatic transaxle perpendicularly to the axle and the motor shaft (in the fore-and-aft direction of the vehicle when the axle is disposed laterally horizontally and the motor shaft is disposed vertically).

Preferably, the hydraulic pump includes a displacement controlling operation shaft which can be selectively disposed between the pump shaft and the axle in the direction perpendicular to the axle, or opposite to the axle with respect to the pump shaft in the direction perpendicular to the axle. Therefore, the optimal position of the variable displacement controlling operation shaft in the vehicle equipped with the hydrostatic transaxle can be selected. Further, when the displacement controlling operation shaft is disposed between the pump shaft and the axle, the above-mentioned advantage is obtained.

Further preferably, the displacement controlling operation shaft is disposed in parallel to the pump shaft and the motor shaft. Therefore, the space for arrangement of the displacement controlling operation shaft can be horizontally minimized. Further, when an arm is fixed on a tip portion of the displacement controlling operation shaft projects upward or downward from the housing of the hydrostatic transaxle, the arm can be rotated horizontally and perpendicular to the axle and the motor shaft (in the fore-and-aft direction of the vehicle when the axle is disposed laterally horizontally and the motor shaft is disposed vertically), so as to be optimally linked with a speed control operation device disposed in front or rear of the hydrostatic transaxle.

Preferably, the hydrostatic transaxle further comprises: a first divisional part and a second divisional part joined to each other so as to constitute the housing; and a center section disposed in the housing and formed therein with a fluid passage. The hydraulic pump and the hydraulic motor are mounted onto the center section so as to be fluidly connected to each other through the fluid passage. The displacement controlling operation shaft is supported at opposites ends thereof by the first and second divisional parts, or by the center section and one of the first and second divisional parts, respectively. Therefore, the center section or the first or second divisional part of the housing is simply formed with a portion for surely supporting the displacement controlling operation shaft.

Preferably, the hydrostatic transaxle further comprises: a first divisional part and a second divisional part joined to each other so as to constitute the housing; and a brake disposed in the housing so as to brake the axle. The brake includes a brake shaft, a swingable member, and a brake shoe. The brake shaft is disposed in parallel to the motor shaft. The brake shaft is divided into first and second brake shaft portions. The first brake shaft portion is supported by the first divisional part of the housing, and the second brake shaft portion is supported by the second divisional part of the housing. One of the first and second brake shaft portions is rotatably centered on the axis thereof. The swingable member is interposed between the first and second brake shaft portions so as to be rotatably integral with the rotatable first or second brake shaft portion. The brake shoe is supported by the swingable member so as to be interposed together with the swingable member between the first and second brake shaft portions. The second gear is disposed between the swingable member and the brake shoe. When the swing arm is rotated, the swing arm acts as a cam so as to push the brake shoe in the axial direction of the brake shaft, thereby pressing and braking the second gear.

Therefore, the brake which presses the second gear for braking the axle can be disposed in the housing of the hydrostatic transaxle. In the case of an ordinary brake including a vertical brake camshaft, the rotated camshaft pushes a brake shoe horizontally. However, the present brake uses the slide of the brake shoe in the axial direction of the brake shaft, so as to horizontally restrict a space for arrangement of the brake even when the brake shaft is disposed vertically.

These, further and other objects, features and advantages will appear more fully from the following description with reference to accompanying drawings.

DETAILED DESCRIPTION OF THE INVENTION

Figure 1:
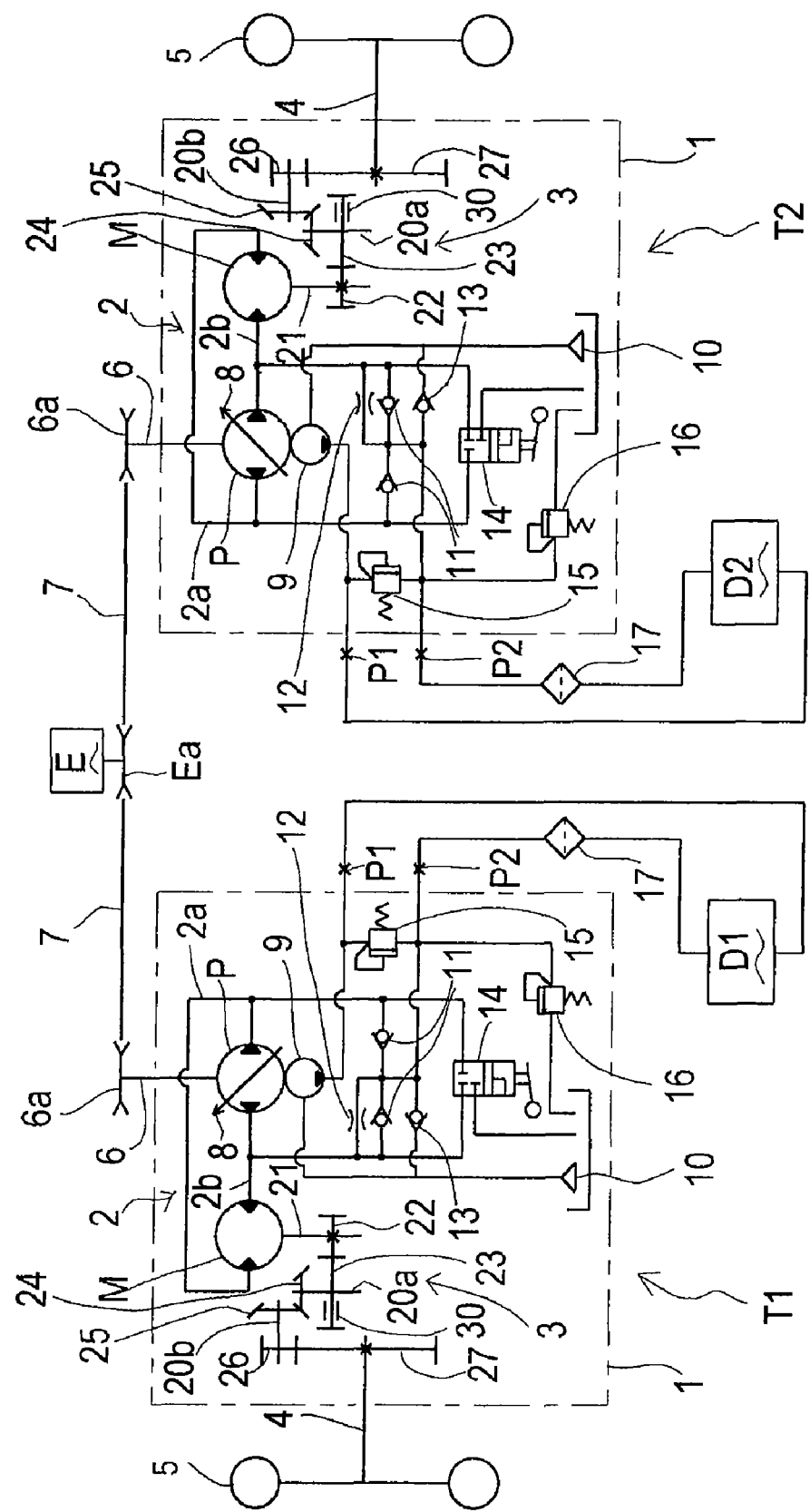
FIG. 1 is a hydraulic circuit and structural skeleton diagram of a hydraulically driven vehicle according to the present invention, equipped with a pair of hydrostatic transaxles T (T1 and T2) for driving respective axles.

Referring to FIG. 1, a vehicle equipped with a pair of left and right symmetric transaxles T1 and T2 will be described. Generally, each of transaxles T1 and T2 includes a housing 1 incorporating an HST 2, an axle 4 and a deceleration gear train 3. In HST 2, a variable displacement hydraulic pump P and a fixed displacement hydraulic motor M are fluidly connected to each other. Deceleration gear train 3 transmits an output force of hydraulic motor M of HST 2 to axle 4. Axle 4 of left transaxle Ti projects leftward from corresponding housing 1, and axle 4 of right transaxle T2 projects rightward from corresponding housing 1. Wheels 5 are provided on respective distal ends of axles 4. Hydraulic pumps P of respective transaxles T1 and T2 include respective input shafts (pump shafts) 6, which project outward from respective housings 1 so as to be disposed in parallel to each other and fixedly provided thereon with respective input pulleys 6a. A transmission belt 7 is interposed between an output pulley Ea of an engine E on the vehicle and each input pulley 6a, so that common engine E synchronously drives both hydraulic pumps P.

In each housing 1, HST 2 is provided with a charge pump 9 driven together with hydraulic pump P by rotation of pump shaft 6. Charge pump 9 absorbs fluid through a fluid filter 10 from a fluid sump in housing 1. Housing 1 is externally provided thereon with a fluid extraction port P1 and a fluid returning port P2. The delivery fluid from charge pump 9 is extracted from housing 1 through fluid extraction port P1, and returned into housing 1 through fluid returning port P2. The returned fluid into housing 1 is supplied through a pair of charge check valves 11 to a closed fluid circuit (a pair of fluid passages 2a and 2b) between hydraulic pump P and motor M in each HST 2.

The closed fluid circuit of each HST 2 is configured so that fluid passage 2a is higher pressurized during forward travel of the vehicle, and fluid passage 2b is higher pressurized during backward travel of the vehicle. The pair of charge check valves 11 are individually provided to respective fluid passages 2a and 2b, so that either (or both) of charge check valves 11 is opened to supply the returned fluid from fluid returning port P2 to corresponding fluid passage (passages) 2a or (and) 2b.

Both ports P1 and P2 of each of transaxles T1 and T2 are connected to each of external hydraulically driven implements D1 and D2 through pipes, so as to supply fluid to each of implements D1 and D2. Examples of implements D1 and D2 are a hydraulic actuator for vertically moving a working device, e.g., a mower, attached to the vehicle, and a hydraulic clutch for the working device. A line filter 17 is provided on the pipe between each fluid returning port P2 and each of implements D1 and D2, so as to filtrate fluid after driving each of implements D1 and D2 and before returning fluid to housing 1 of each of transaxles T1 and T2.

An implement relief valve 15 is disposed in each housing 1 so as to regulate the hydraulic pressure of the delivery fluid from charge pump 9 to be supplied to each of implements D1 and D2. Fluid released from implement relief valve 15 joins the returned fluid from fluid returning port P2. A charge relief valve 16 is disposed in each housing 1 so as to regulate the hydraulic pressure of the returned fluid from fluid returning port P2 to be supplied to the closed fluid circuit of HST 2 through charge check valves 11. Fluid released from charge relief valve 16 is drained into the fluid sump in housing 1.

In each housing 1, a neutral zone expansion fluid path including an orifice 12 bypasses charge check valve 11 for fluid passage 2b to be higher pressurized during backward travel of the vehicle, so as to return fluid from fluid passage 2b higher-pressurized during backward travel of the vehicle to the fluid returning passage from fluid returning port P2 at the upstream side of charge check valves 11. Therefore, the hydraulic pressure in fluid passage 2b becomes a value corresponding to the neutral state of HST 2 when a movable swash plate 8 of hydraulic pump P moved from an angle corresponding to a backward travel speed reaches a position adjacent to a proper neutral position of swash plate 8. In other words, the neutral zone of HST 2 is expanded into a range essentially belonging to a backward travel speed range of HST 2.

Further, in each housing 1, a free wheel prevention fluid passage including a check valve 13 is branched from the suction fluid passage from fluid filter 10 to charge pump 9, and connected to the returned fluid passage at the upstream side of charge check valves 11 (from fluid returning port P2). When the vehicle is towed on a descending slope, hydraulic motor M is rotated following rotating wheel 5, however, hydraulic pump P and charge pump 9 are stationary because engine E is stationary. Consequently, either fluid passage 2a or 2b is excessively pressurized and fluid leaks from hydraulic pump P or motor M, thereby reducing the amount of fluid in the closed fluid circuit between hydraulic pump P and motor M. When the hydraulic pressure in the charge fluid passages connected to respective fluid passages 2a and 2b through respective charge check valves 11 becomes lower than the pressure of the fluid sump in housing 1, stationary charge pump 9 cannot supply fluid to fluid passages 2a and 2b, however, check valve 13 is opened to supply fluid from the fluid sump in housing 1 through fluid filter 10 to fluid passages 2a and 2b.

Further, a bypass valve 14 is disposed in each housing 1 so as to make a motor shaft 21 of hydraulic motor M rotatable following rotating wheel 5. Bypass valve 14 is manually operable so as to be switched between an opened valve position and a closed valve position. Bypass valve 14 is normally disposed at the closed valve position. When hydraulic motor M has to be rotatable following rotating wheel 5, bypass valve 14 is switched to the opened valve position so as to drain fluid from both fluid passages 2a and 2b to the fluid sump in housing 1, thereby canceling the dynamic braking action of fluid in hydraulic pump P and fluid passages 2a and 2b, and thereby making hydraulic motor M rotatable following rotating wheel 5.

In this way, HST 2 in each of transaxles T1 and T2 is configured so that the delivery fluid from hydraulic pump P drives hydraulic motor M, and the fluid delivery direction and amount are controlled by controlling the tilt angle and direction of movable swash plate 8 of hydraulic pump P so as to control the rotation speed and direction of hydraulic motor M (motor shaft 21). When axles 4 of respective transaxles T1 and T2 are rotated in the same speed and direction, the vehicle travels straight. When movable swash plates 8 are operated so as to differentially rotate left and right axles 2, the vehicle turns left or right.

In each housing 1, deceleration gear train 3 drivingly connects motor shaft 21 to axle 4. Deceleration gear train 3 includes an L-shaped counter shaft 20 consisting of a first shaft portion 20a and a second shaft portion 20b. A gear fitted on second shaft portion 20a meshes with a gear (final gear) 27 fixed on axle 4, and a bevel gear 24 fitted on first shaft portion 20a meshes with a bevel gear 25 fitted on second shaft portion 20b, so as to constitute deceleration gear train 3.

In each of transaxles T1 and T2, brake 30 for braking axle 4 is arranged so as to sandwich gear 23 fixed on first shaft portion 20a. During a braking operation, brake 30 presses and stops gear 23 so as to brake axle 4 (and wheel 5).

Description of the structure of the vehicle equipped with left and right hydrostatic transaxles T1 and T2 is concluded. A structure of hydrostatic transaxle T (a generic name for left and right transaxles T1 and T2) will now be described with reference to FIGS. 2 to 11. Here, hydrostatic transaxle T shown in FIGS. 2 to 11 is one of left and right transaxles T1 and T2 (when axle 4 is assumed to be disposed in front of HST 2, illustrated transaxle T is left transaxle T1 because axle 4 projects leftward from housing 1). An imaginary transaxle, which is laterally symmetric with either transaxle T1 or T2 shown in FIGS. 2 to 11, serves as the other transaxle T2 or T1 unshown in FIGS. 2 to 11. The following description is based on the assumption that axle 4 is disposed laterally horizontally, pump shaft 6 and motor shaft 21 are disposed vertically, and axle 4 is disposed in front of HST 2.

Figure 2:
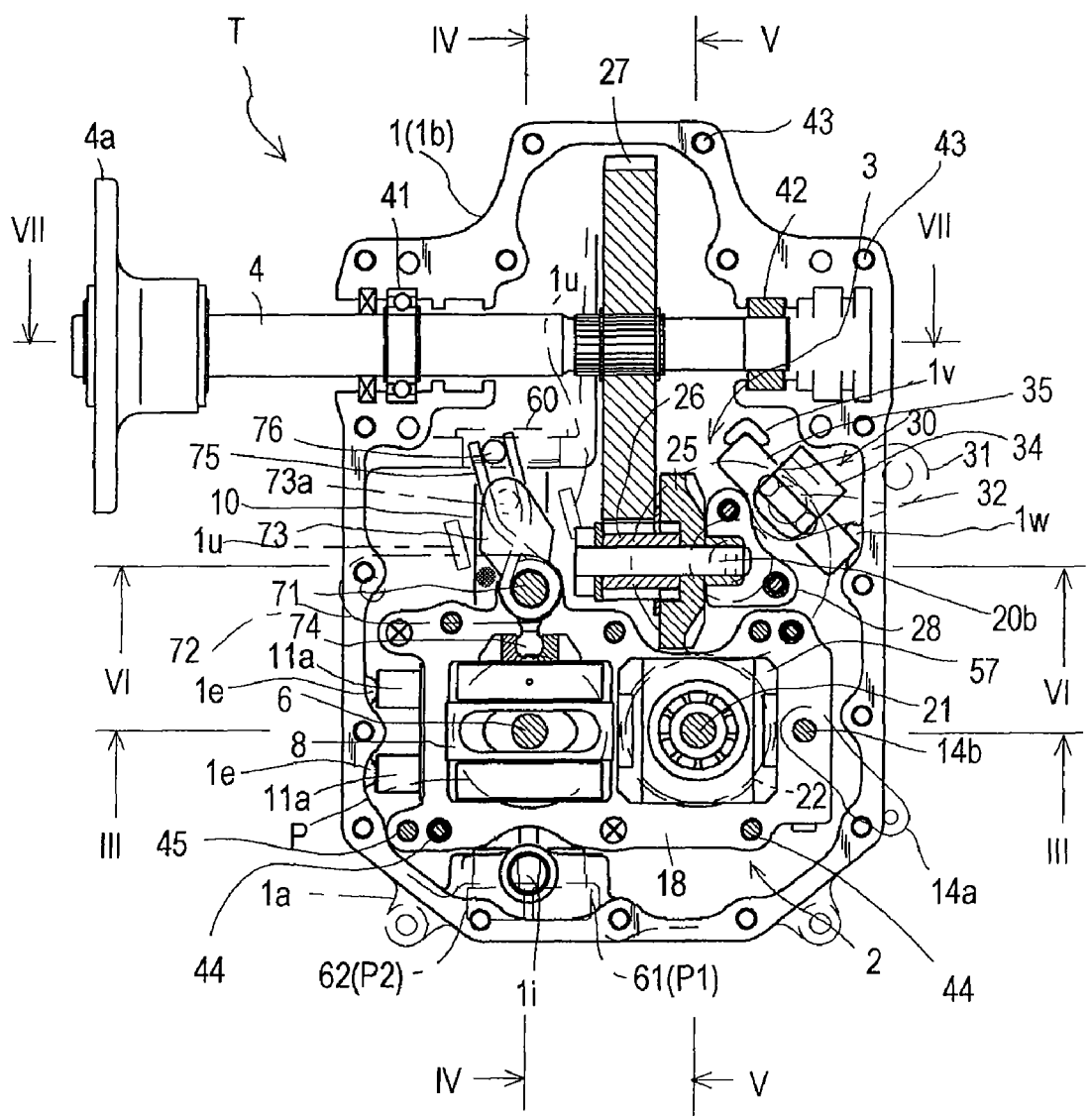
FIG. 2 is a plan view of hydrostatic transaxle T from which an upper housing part 1a is removed.
Figure 3:
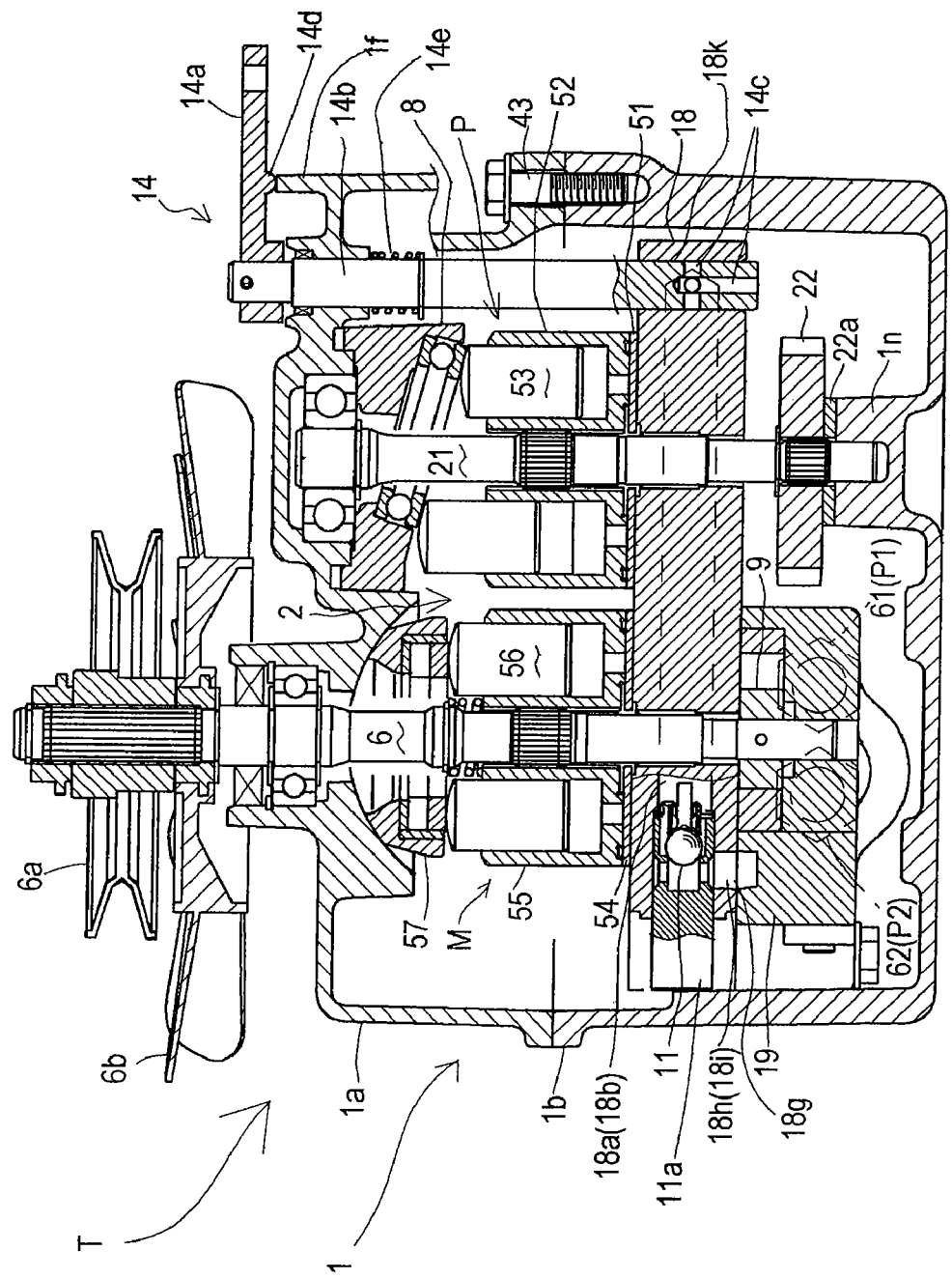
FIG. 3 is a cross sectional view taken along III-III line of FIG. 2.
Figure 5:
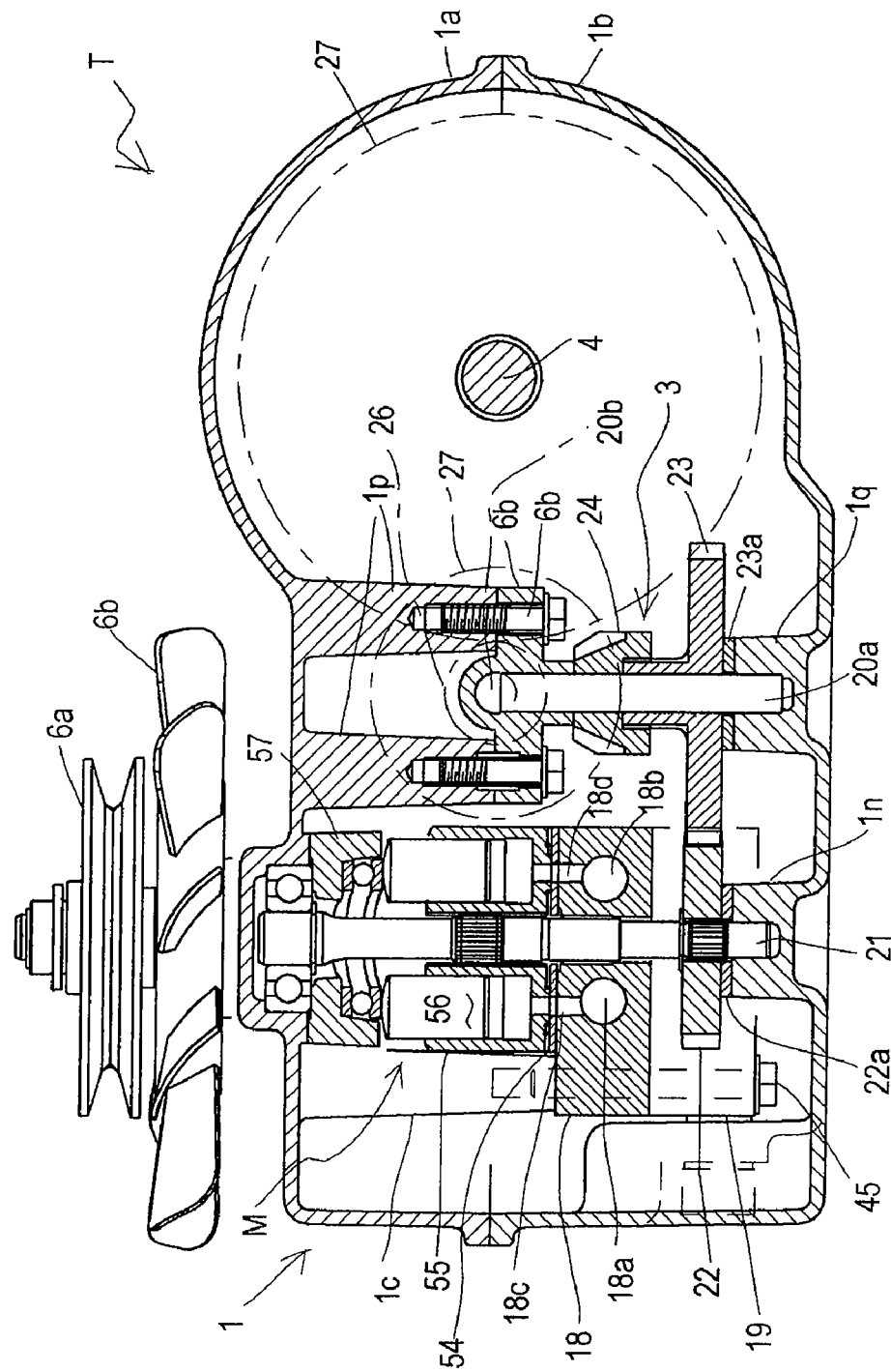
FIG. 5 is a cross sectional view taken along V-V line of FIG. 2.
Figure 6:
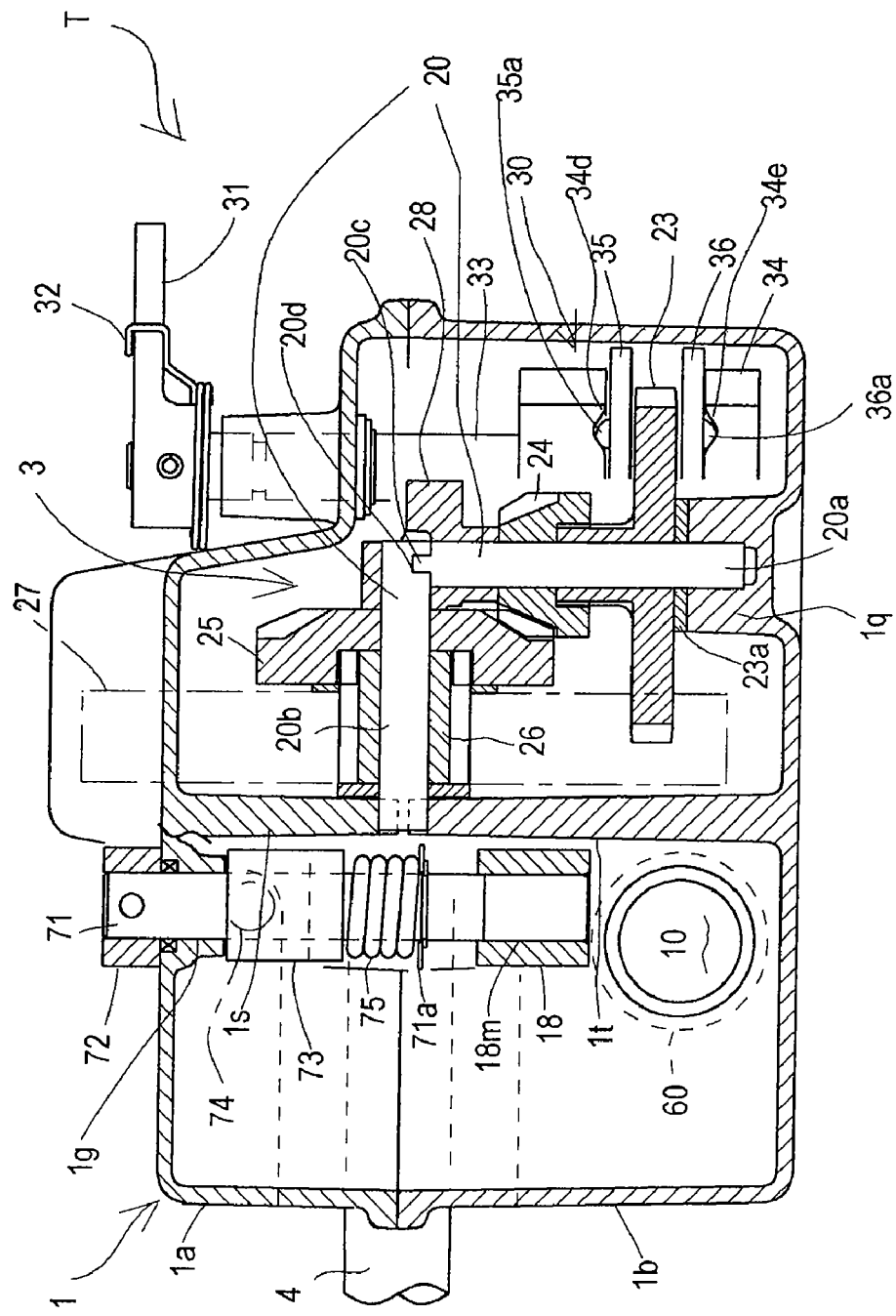
FIG. 6 is a cross sectional view taken along VI-VI line of FIG. 2.
Figure 7:
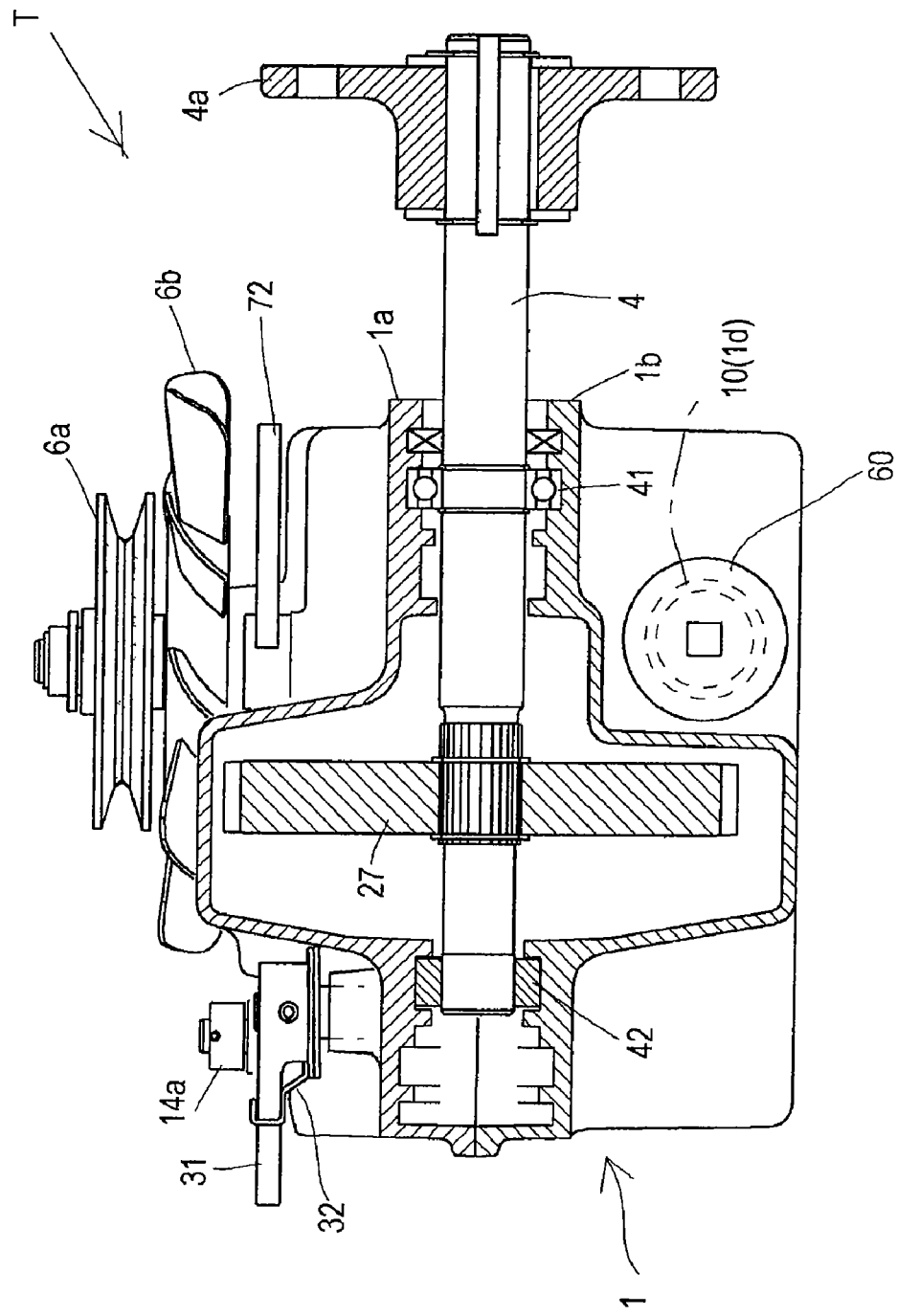
FIG. 7 is a cross sectional view taken along VII-VII line of FIG. 2.

As shown in FIGS. 2 to 7, an upper housing part 1a and a lower housing part 1b are vertically joined to each other through a horizontal joint surface, and fastened to each other at circumferential portions thereof by vertical bolts 43 as shown in FIGS. 2 and 3, thereby constituting housing 1. As shown in FIGS. 2 and 7, a center axis of axle 4 is disposed on the horizontal joint surface between upper and lower housing parts 1a and 1b, so that axle 4 is journalled by left and right bearings 41 and 42 clamped between upper and lower housings 1a and 1b. Final gear 27 is fixed on axle 4 between bearings 41 and 42. Axle 4 is formed at an outer end thereof into a flange 4a, onto which wheel 5 is attached.

HST 2 will be described with reference to FIGS. 2 to 9. A horizontal flat plate-shaped center section 18 and a charge pump housing 19 are disposed in housing 1 (more specifically, in lower housing part 1b as shown in FIGS. 2 to 5), so that charge pump housing 19 is joined at a top surface thereof to a bottom surface of center section 18. A bottom surface of charge pump housing 19 is spaced upward from an upper bottom surface of housing 1 (lower housing part 1b). As shown in FIG. 5, a support wall portion 1c is extended substantially downward from a ceiling portion of upper housing part 1a and abuts at a bottom end thereof against a top surface of center section 18. Vertically upward bolts 44 shown in FIGS. 2 and 8 fasten only center section 18 to support wall portion 1c, and vertically upward bolts 45 shown in FIGS. 2, 5, 8 and 9 fasten both center section 18 and charge pump housing 19 to support wall portion 1c.

As noticed from FIGS. 3, 4, 5 and 8, center section 18 is bored therein with fore-and-aft juxtaposed fluid holes 18a and 18b. Fluid hole 18a, corresponding to fluid passage 2a, and fluid hole 18b, corresponding to fluid passage 2b, are extended laterally horizontally (in parallel to axle 4). As shown in FIGS. 2 to 5, the top surface of center section 18 is formed at one of left and right portions thereof (in this embodiment, at a right portion thereof) with a pump mounting surface, and at the other right or left portion thereof (in this embodiment, at a left portion thereof) with a motor mounting surface. Kidney ports 18c and 18d are opened at the pump mounting surface and connected to respective fluid holes 18a and 18b. Kidney ports 18e and 18f are opened at the motor mounting surface and connected to respective fluid holes 18a and 18b. A cylinder block 52 of hydraulic pump P is slidably rotatably fitted onto the pump mounting surface through a valve plate 51, and a cylinder block 55 of hydraulic motor M is slidably rotatably fitted onto the motor mounting surface through a valve plate 54.

Figure 4:
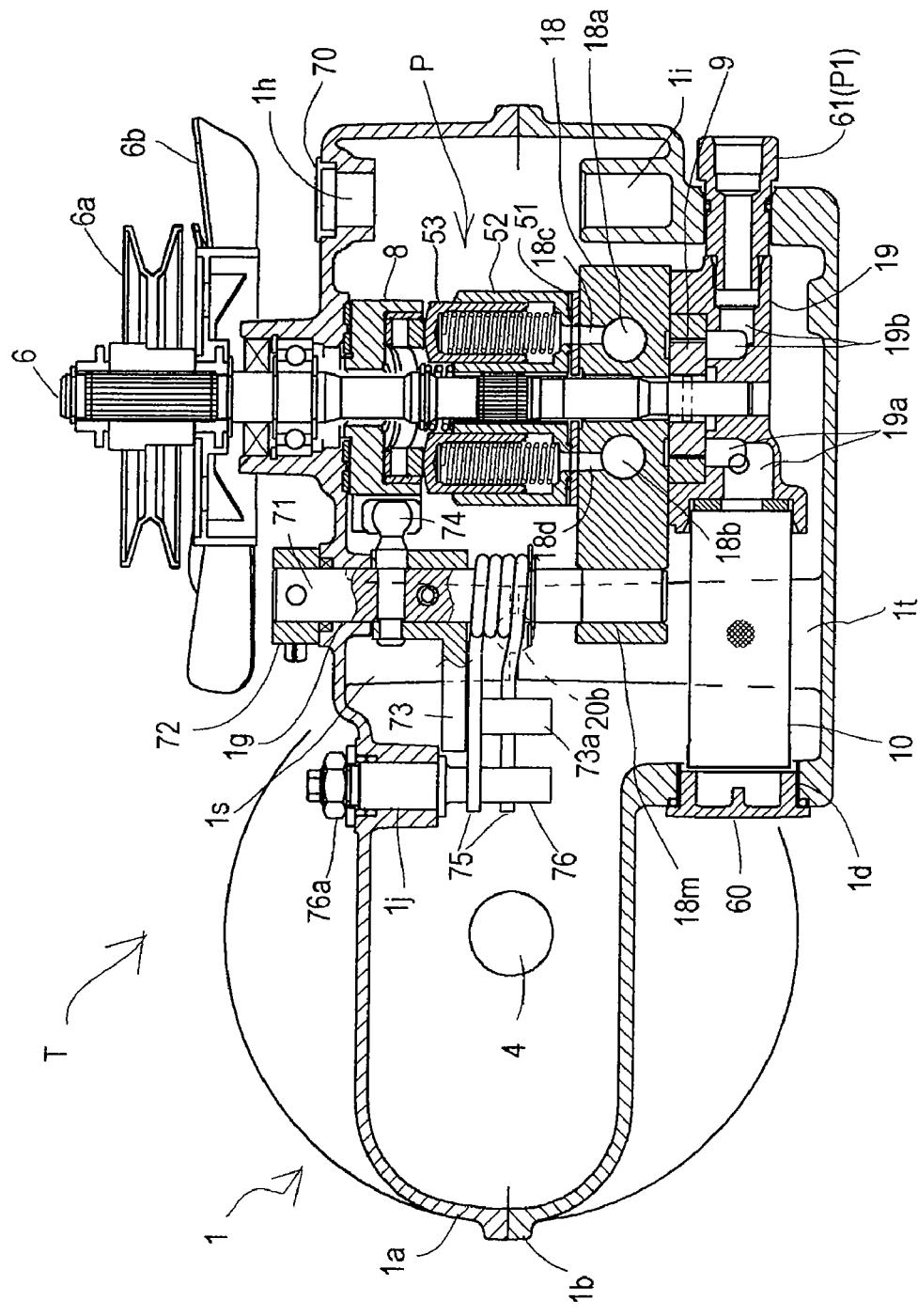
FIG. 4 is a cross sectional view taken along IV-IV line of FIG. 2.

As shown in FIGS. 3 and 4, pistons 53 are vertically reciprocally fitted into cylinder block 52, and pistons 56 are vertically reciprocally fitted into cylinder block 55. Top heads of pistons 53 project upward from cylinder block 52 so as to be pressed against movable swash plate 8 slidably rotatably supported onto the ceiling portion of upper housing part 1a, and top heads of pistons 56 project upward from cylinder block 55 so as to be pressed against a fixed swash plate 57 fixedly supported onto the ceiling portion of upper housing part 1a.

As shown in FIGS. 3 and 5, cylinder block 55 of hydraulic motor M is relatively unrotatably fitted on vertical motor shaft 21, and pistons 56 are aligned radially around motor shaft 21 in cylinder block 55. Motor shaft 21 is extended upward from cylinder block 55 so as to freely rotatably penetrate fixed swash plate 57 and to be journalled by the ceiling portion of upper housing part 1a through a bearing. Motor shaft 21 is also extended downward from center section 18 so as to be drivingly connected to axle 4 through deceleration gear train 3.

As best shown in FIGS. 3 and 4, cylinder block 52 of hydraulic pump P is relatively unrotatably fitted on vertical pump shaft 6, and pistons 53 are aligned radially around pump shaft 6 in cylinder block 52. Pump shaft 6 is extended upward from cylinder block 52 so as to freely rotatably penetrate movable swash plate 8 and to be journalled by the ceiling portion of upper housing part 1a through a bearing. Pump shaft 6 further projects upward from the top of upper housing part 1a so as to be fixedly provided thereon with input pulley 6a and cooling fan 6b. Pump shaft 6 is also extended downward from cylinder block 52, relatively rotatably passed through valve plate 51 and center section 18, and journalled at a bottom end thereof by charge pump housing 19 under center section 18.

Figure 9:
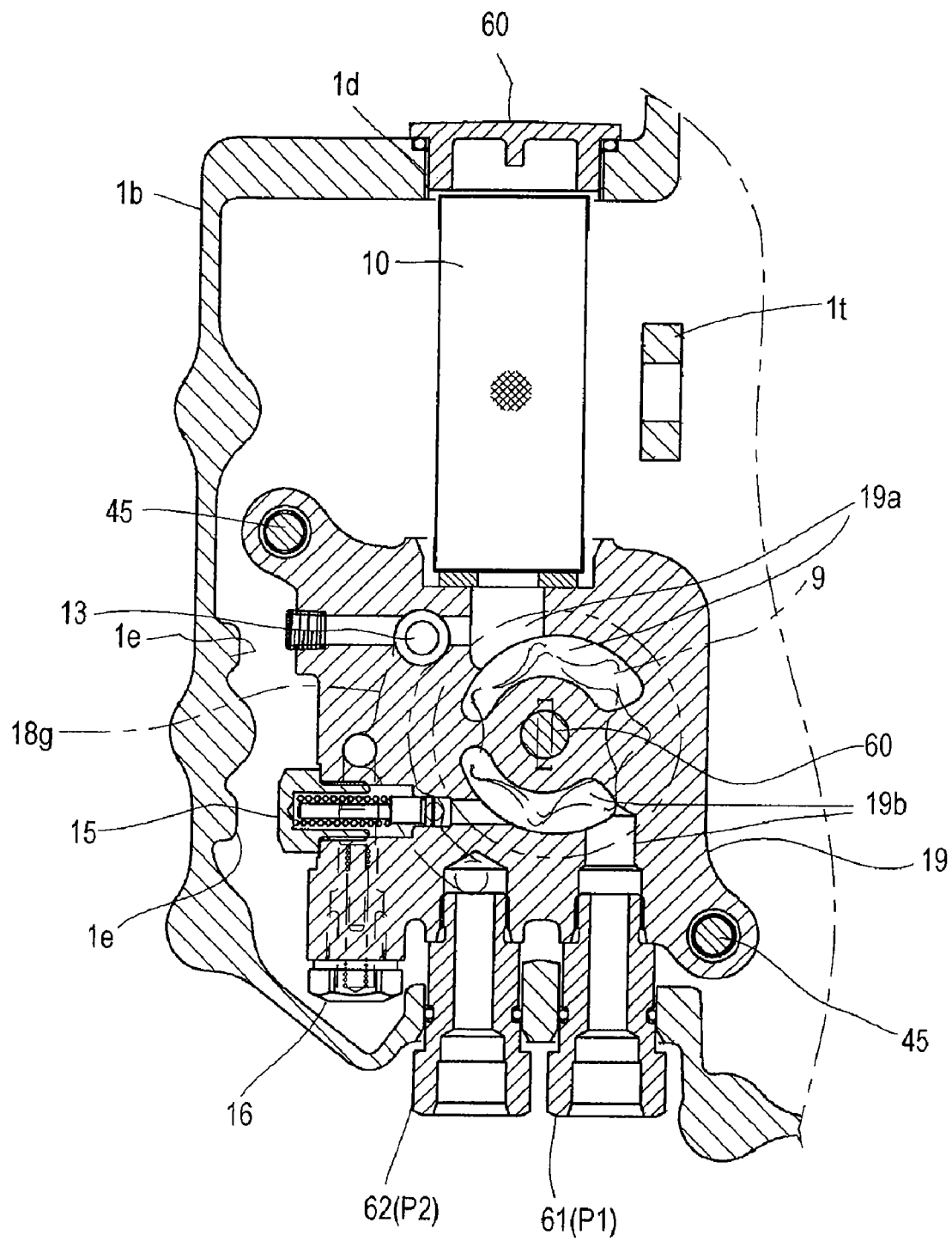
FIG. 9 is a sectional plan view of a charge pump housing 19 with an interior structure thereof.
Figure 10:
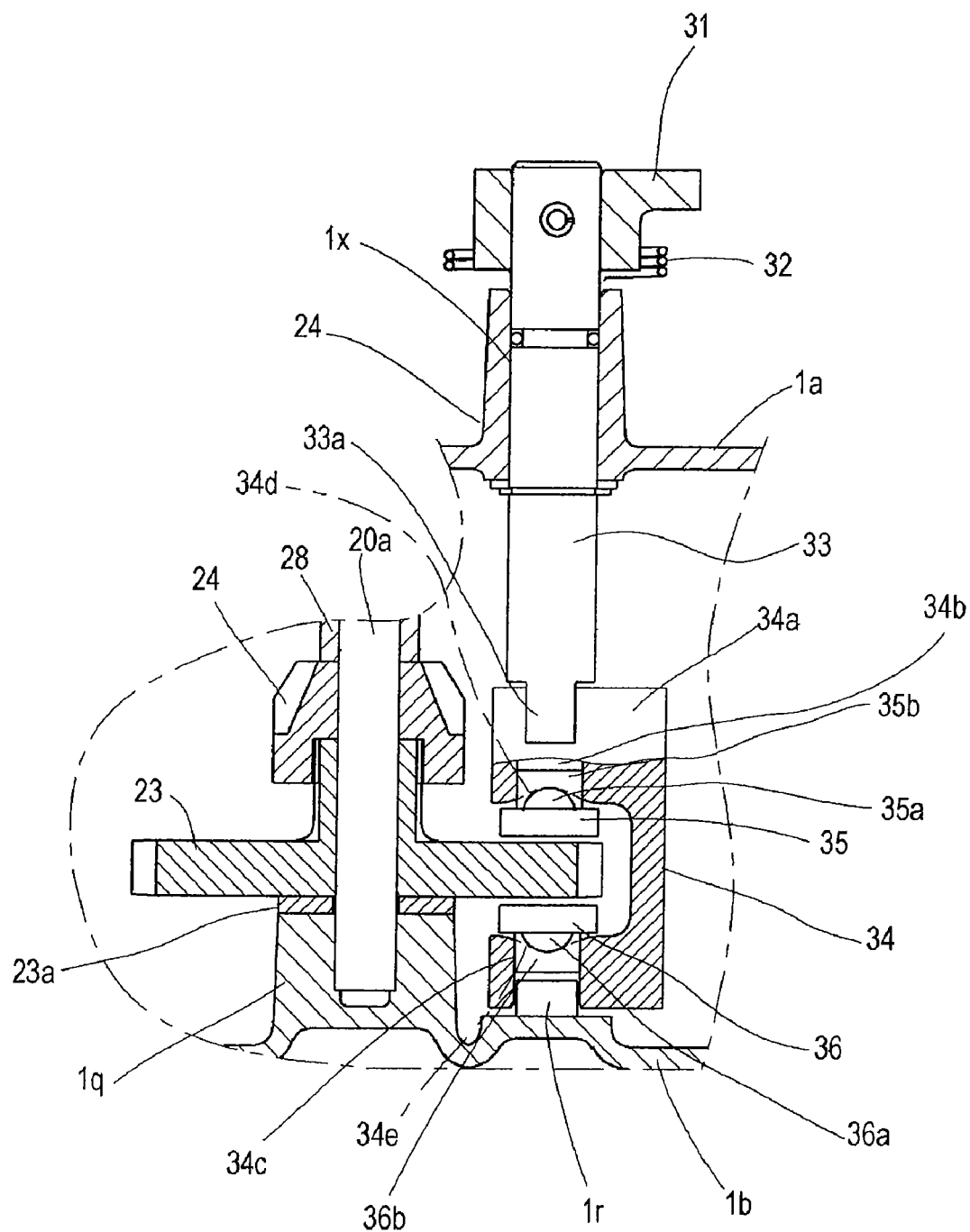
FIG. 10 is a fragmentary sectional side view of transaxle T showing a brake 30 when a brake shaft 31 and a first shaft portion 20a of a counter shaft 20 are juxtaposed.
Figure 11:
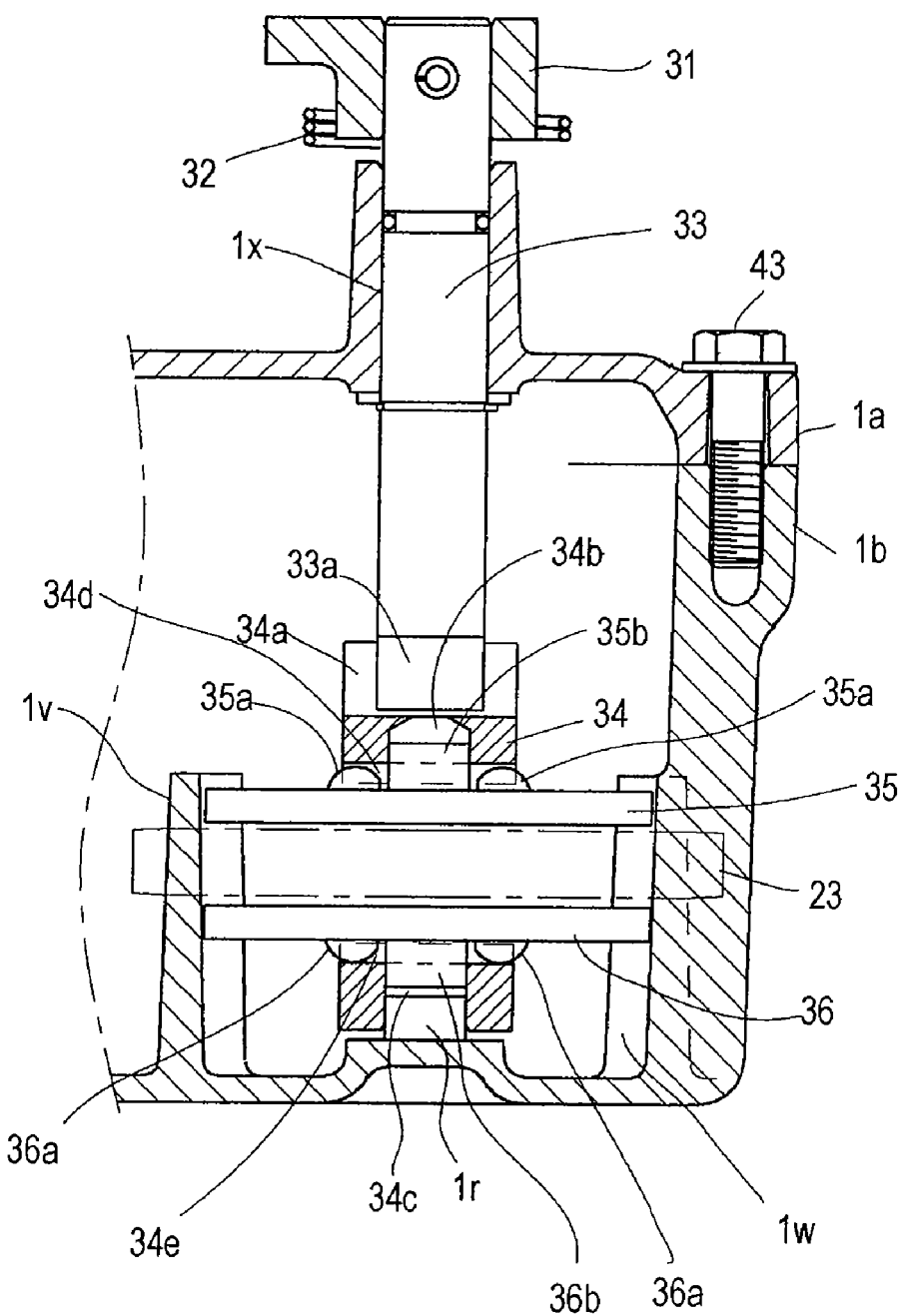
FIG. 11 is a fragmentary sectional side view of transaxle T showing brake 30 when first shaft portion 20a and brake shaft 31 are viewed so that they overlap each other and when first shaft portion 20a and gears fitted thereon are removed.

As shown in FIGS. 3, 4 and 9, charge pump housing 19 incorporates trochoidal charge pump 9. The downwardly extended portion of pump shaft 6 is disposed in charge pump housing 19 so as to serve as a drive shaft of charge pump 9. As shown in FIGS. 4 and 9, charge pump 9 is formed at one side thereof with a suction port 19a, and at another opposite side thereof with a delivery port 19b. Suction port 19a is extended horizontally and opened outward (to the fluid sump in housing 1) on a side surface of charge pump housing 19. Cylindrical fluid filter 10 is axially horizontally extended (in the fore-and-aft direction) and is engaged at an inner end thereof to an outer side surface (front surface) of charge pump housing 19 so as to cover the open outer end of suction port 19a. Fluid filter 10 faces at an outer end thereof to a penetrating hole 1d bored in a side wall of housing 1 (lower housing part 1b). In normal, penetrating hole id is plugged with a lid 60, and the outer end of fluid filter 10 is engaged with lid 60, as shown in FIGS. 4, 7 and 9. For maintenance of fluid filter 10, lid 60 is removed so as to open penetrating hole 1d, thereby enabling easy removal or assembly of fluid filter 10 from and into housing 1.

As shown in FIGS. 3, 4 and 9, onto a rear portion of charge pump housing 19 are fitted a port member 61, serving as fluid extraction port P1 shown in FIG. 1, and a port member 62, serving as fluid returning port P2 shown in FIG. 1. Port members 61 and 62 are extended horizontally rearward, penetrate an outer (rear end) wall of lower housing part 1b, and project outward from housing 1 so as to be joined to respective pressure fluid pipes (such as hoses) extended to either external implement D1 or D2.

Each of port members 61 and 62 is penetrated by an axial fluid hole. The fluid hole of port member 61 is connected to delivery port 19b so that fluid delivered from charge pump 9 is supplied to either external implement D1 or D2 through port member 61 (i.e., fluid extraction port P1). The fluid hole of port member 62 is not connected to delivery port 19b, but is connected to a substantially arcuate charge fluid groove 10g formed in the bottom surface of center section 18, as shown in FIGS. 8 and 9.

In this way, an oil passage is formed from the fluid sump in housing 1 to charge fluid groove 10g through fluid filter 10, suction port 19a, charge pump 9, delivery port 19b, fluid extraction port P1 (port member 61), external implement D1 or D2, and fluid returning port P2 (port member 62).

Figure 8:
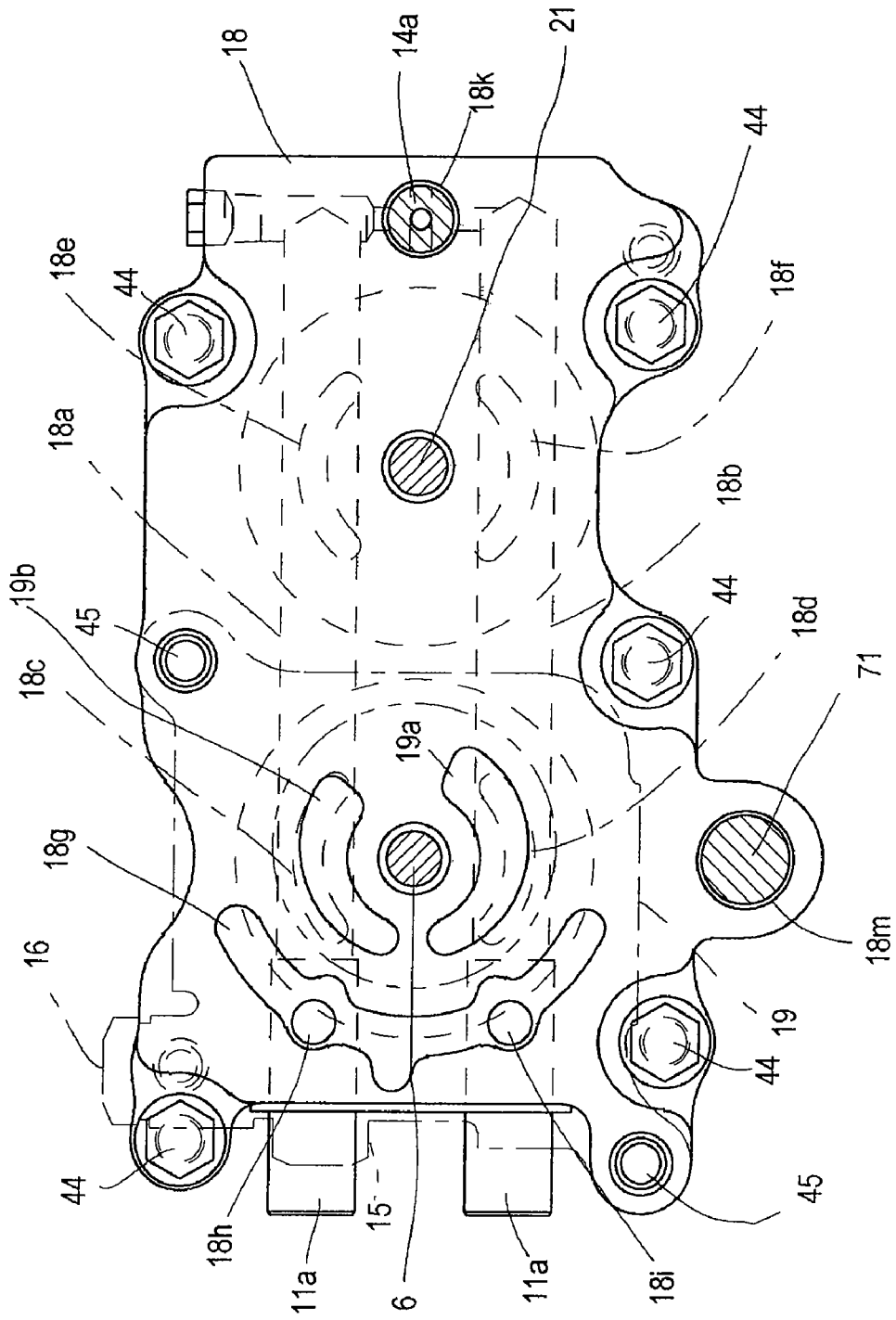
FIG. 8 is a bottom view of a center section 18.

As shown in FIGS. 8 and 9, implement relief valve 15 is fitted in charge pump housing 19 so as to regulate the hydraulic pressure in delivery port 19b, i.e., the pressure of fluid to be supplied to external implement D1 or D2 through fluid extraction port P1 (port member 61), and to drain excessive fluid from delivery port 19b to charge fluid groove 10b. Charge relief valve 16 is also fitted in charge pump housing 19 so as to regulate the hydraulic pressure in charge fluid groove 18g, i.e., the charge pressure of fluid to be charged into fluid passages 2a and 2b (fluid holes 18a and 18b) constituting the closed fluid circuit of HST 2, and to drain excessive fluid from charge fluid groove 18g to the fluid sump in housing 1.

As shown in FIGS. 3 and 8, vertical charge ports 18h and 18i are bored in charge pump housing 19 so as to be extended upward from charge fluid groove 18g and connected to respective fluid holes 18a and 18b through respective charge check valves 11. Fluid in charge fluid groove 18g is compressed by charge pump 9 and supplied to either fluid passage 18a or 18b through opened one of charge check valves 11. Casings 11a incorporating respective charge check valves 11 project outward from center section 10 as shown in FIGS. 2, 3 and 8, and are pressed at outer ends thereof against respective valve pressing portions 1e formed on lower housing part 1b, as shown in FIGS. 2 and 9.

Orifice 12 for expanding the neutral zone of HST 2 into the proper backward traveling speed setting range, as shown in FIG. 1, is formed within center section 18 so as to be interposed between fluid hole 18b and charge fluid groove 18g.

Further, center section 18 is formed therein with a vertical penetrating hole 18k, as shown in FIGS. 3 and 8, and with a pair of fluid holes extended to vertical penetrating hole 18k from closed end portions of respective fluid holes 18a and 18b opposite to charge check valves 11. A vertical bypass shaft 14b, serving as bypass valve 14 shown in FIG. 1, is journalled at an upper portion thereof by upper housing part 1a through a bearing, and rotatably passed through vertical penetrating hole 18k of center section 18. The portion of bypass shaft 14b within vertical penetrating hole 18k is bored therein with a T-shaped bypass fluid hole 14c consisting of a horizontal diametric fluid hole portion and a vertical fluid hole portion extended downward from the middle portion of the horizontal diametric fluid hole portion. A bottom of the vertical fluid hole portion is opened at a bottom end of bypass shaft 14 projecting downward from the bottom surface of center section 18, and opened to the fluid sump in housing 1

A top portion of bypass shaft 14 projects upward from housing 1 so as to be fixedly provided thereon with a bypass arm 14a. A projection 14d is extended downward from bypass arm 14a and disposed slidably along an upwardly projecting guide portion 1f formed on a top surface of upper housing part 1a. A pair of detent grooves are formed at determined positions on guide portion 1f. Projection 14d is selectively engaged into one of the detent grooves so as to determine whether bypass arm 14a and bypass shaft 14b are disposed at a normal position or a bypass position. A spring 14e is wound around bypass shaft 14b in housing 1 so as to bias bypass shaft 14b and bypass arm 14a to the normal position.

Bypass arm 14a is disposed at the normal position by the biasing force of spring 14e unless an operation force is applied onto bypass arm 14a. In this state, the horizontal fluid hole portion of bypass fluid hole 14c is offset from the openings of the fluid holes from respective fluid holes 18a to vertical penetrating hole 18k, so that bypass shaft 14b shuts off the fluid communication between fluid holes 18a and 18b. FIGS. 3 and 8 illustrate bypass shaft 14b disposed at the normal position. When bypass arm 14a is disposed at the bypass position, the horizontal fluid hole portion of bypass fluid hole 14c is opened through vertical penetrating hole 18k to the openings of the fluid holes extended from respective fluid holes 18a and 18b, thereby draining fluid from both fluid holes 18a and 18b to the fluid sump in housing 1 through bypass fluid hole 14c. Therefore, fluid is drained from the closed fluid circuit of HST 2 (fluid passages 2a and 2b) so as to allow free rotation of hydraulic motor M following the rotation of wheels 5 on the ground while hydraulic pump P is stationary.

Further, as shown in FIG. 9, a free wheel prevention fluid passage including check valve 13 is formed within charge pump housing 19 so as to branch from suction port 19a opened to fluid filter 10, and to be connected to charge fluid groove 18g at the bottom surface of center section 18. In the case that the vehicle is towed on a descending slope or in another case, when the fluid pressure in charge fluid groove 18g is lowered because of fluid leak from hydraulic pump P or motor M, check valve 13 is opened so as to supply charge fluid groove 18g with fluid from the fluid sump in housing 1 through fluid filter 10, instead of stationary charge pump 9. Therefore, fluid is supplied to the closed fluid circuit of HST 2 (fluid passages 2a and 2b) so as to properly load wheels 5, thereby preventing unexpected speeded descent of the vehicle.

A pump control system for controlling movable swash plate 8 of hydraulic pump P will now be described with reference to FIGS. 2, 4, 6 and others. As shown in FIGS. 2 and 4, in transaxle T, the pump control system can be selectively disposed at either a position between axle 4 and hydraulic pump P or a position behind hydraulic pump P (i.e., opposite to axle 4 with respect to hydraulic pump P). In this regard, a vertical penetrating hole 1g is bored in a top wall of upper housing part 1a, as shown in FIGS. 4 and 6, and a vertical penetrating hole 18m is bored in center section 18 below upper housing part 1a so as to be coaxially connected to vertical penetrating hole 1g, as shown in FIGS. 4, 6 and 8, thereby journaling a vertical pump control shaft 71 for controlling the displacement of hydraulic pump P at the position between axle 4 and hydraulic pump P. On the other hand, a vertical penetrating hole 1h is bored in a top wall of upper housing part 1a, as shown in FIG. 4, and an upwardly opened recess 1i is formed in lower housing part 1b below upper housing part 1a so as to be coaxially connected to vertical penetrating hole 1h, as shown in FIGS. 2 and 4, thereby journaling vertical pump control shaft 71 at the position behind hydraulic pump P. In the present embodiment, the position between hydraulic pump P and axle 4 is selected for arrangement of the pump control system, that is, pump control shaft 71 is rotatably passed through vertical penetrating holes 1g and 18m, while the top opening of vertical penetrating hole 1h disposed behind hydraulic pump P is out of use and covered with a lid 70 as shown in FIG. 4.

As shown in FIGS. 4 and 6, pump control shaft 71 passed through penetrating holes 1g and 18m projects upward from the top surface of upper housing part 1a so as to be fixedly provided thereon with an outer pump control arm 72, which is operatively connected to a speed control operation device, such as a lever or a pedal, on the vehicle. In housing 1, an inner pump control arm 73 is fastened onto pump control shaft 71 together with a connection member 64 planted into pump control shaft 71, and connection member 64 is fitted into a recess 8a formed on a side portion of movable swash plate 8. Therefore, when outer pump control arm 72 is horizontally rotated by operating the speed control operation device, pump control shaft 71 is rotatably centered on the axis thereof so as to tilt movable swash plate 8.

As shown in FIG. 2, a pair of stoppers 1u are extended downward from the ceiling portion of upper housing part 1a so as to demarcate a rotation range of inner pump control arm 73. When inner pump control arm 73 abuts against one of stoppers 1u, movable swash plate 8 reaches its maximum speed position (maximum displacement position) of forward travel. When inner pump control arm 73 abuts against the other stopper 1u, movable swash plate 8 reaches its maximum speed position (maximum displacement position) of backward travel.

As shown in FIGS. 2, 4 and 6, a spring retainer 71a is integrally formed or fixed on pump control shaft 71 between the top surface of center section 18 and a bottom surface of inner pump control arm 73, and a neutral-returning spring 75 is wound around pump control shaft 71 between spring retainer 71a and inner pump control arm 73. Both end portions of spring 75 are twisted to cross each other, and extended. A horizontal portion is extended from the bottom of inner pump control arm 73, and a pushing pin 73a projects vertically downward from the horizontal portion of pump control arm 73. As shown in FIG. 4, a vertical penetrating hole 1j is formed in a top wall of upper housing part 1a in front of vertical penetrating hole 1h (toward axle 4), and a neutral positioning pin 76 is passed through vertical penetrating hole 1j. A top portion of neutral positioning pin 76 is screwed up by a nut 76a above the top surface of upper housing part 1a.

As shown in FIG. 4, in housing 1, neutral positioning pin 76 is extended downward from penetrating hole 1j of upper housing part 1a, so as to be sandwiched together with pushing pin 73a between the end portions of neutral-returning spring 75. When pump control shaft 71 is rotated from the neutral position, movable swash plate 8 is tilted as mentioned above, and simultaneously, pushing pin 73a on inner pump control arm 73 is rotated together with pump control shaft 71 so as to push one of the end portions of neutral-returning spring 75 away from the other end portion of neutral-returning spring 75 retained by neutral positioning pin 76, thereby causing a biasing force of spring 76 for returning pump control shaft 71 and movable swash plate 8 to their neutral positions. Consequently, pushing pin 73a returns to be nipped together with neutral positioning pin 76 between the end portions of spring 76.

A lower portion of neutral positioning pin 76 extended downward from penetrating hole 1j is axially eccentrically offset from an upper portion of neutral positioning pin 76 in penetrating hole 1*j*. When nut 76*a* is loosened and the top portion of neutral positioning pin 76 is rotated, the lower portion of neutral positioning pin 76 revolves around the upper portion of neutral positioning pin 76, so as to change the position thereof relative to pushing pin 73*a*, thereby eliminating a locative error of the neutral position of pump control shaft 71 with pump control arms 72 and 73 relative to the neutral position of movable swash plate 8 for actually ensuring the neutral state of HST 2.

Incidentally, no hole corresponding to penetrating hole 1*j* for journaling neutral positioning pin 76 is provided adjacent to penetrating hole 1*h* and recess 1*i* formed adjacent to the rear end portion of housing 1. In this regard, in the case that pump control shaft 71 is journalled in penetrating hole 1*h* and recess 1*j*, pump control shaft 71 is provided with no neutral-returning spring, or with a neutral-returning spring and without a neutral positioning pin. Alternatively, instead of the neutral-returning spring wound around pump control shaft 71, a neutral-returning means is attached to the speed control operation device linked with outer pump control arm 72.

Description of the structure of HST 2 is concluded. Deceleration gear train 3 interposed between motor shaft 21 and axle 4 will now be described. As shown in FIGS. 3 and 5, a motor output gear 22 is fixed on the portion of motor shaft 21 extended downward from center section 18. On the other hand, a motor shaft support portion 1*n* is formed on a bottom portion of lower housing part 1*b* so as to project upward, and to be formed at a top portion thereof with an upwardly opened recess, into which a bottom end of motor shaft 21 is rotatably fitted. A washer 22*a* is disposed around motor shaft 21 so as to be sandwiched between the top surface of motor shaft support portion 1*n* and a bottom surface of motor output gear 22.

As shown in FIG. 5, a pair of front and rear upper counter shaft support legs 1*p* are extended downward between hydraulic motor M and axle 4 from the ceiling portion of upper housing part 1*a*. As shown in FIGS. 5 and 6, a lower counter support portion 1*q* is formed on a bottom portion of lower housing part 1*b* so as to project upward, and to be formed at a top portion thereof with an upwardly opened recess, into which a bottom end of vertical first shaft portion 20*a* is fitted. Counter gear 23 is fitted on first shaft portion 20*a* above lower counter shaft support portion 1*q*, and meshes with motor output gear 22. A washer 23*a* is disposed around first shaft portion 20*a* so as to be sandwiched between a bottom surface of counter gear 23 and the top surface of lower counter shaft support portion 1*q*.

As shown in FIGS. 5 and 6, a boss portion of counter gear 23 is extended upward along first shaft portion 20*a*. A bevel gear 24 is spline-fitted onto the boss portion of counter gear 23 so as to be fitted onto first shaft portion 20*a*, so that bevel gear 24 is rotatable integrally with counter gear 23. The pair of upper counter shaft legs 1*p* are fastened at bottom ends thereof onto a bearing block 28 by respective bolts 29. A downwardly opened vertical recess is formed within bearing block 28 between bolts 29.

First shaft portion 20*a* is extended upward from bevel gear 24 and inserted into the recess formed within bearing block 28. A bottom portion of bearing block 28 is extended downward along first shaft portion 20*a* and slidably and relatively rotatably abuts at the bottom surface thereof against a top surface of bevel gear 24, thereby determining the vertical position of bevel gear 24 and counter gear 23 along first shaft portion 20*a*.

As shown in FIG. 6, a lateral horizontal hole (parallel to axle 4) is formed within bearing block 28 so as to be connected to a top end of the downwardly opened recess formed within bearing block 28. Lateral horizontal second shaft portion 20*b* (parallel to axle 4) is inserted in the horizontal hole within bearing block 28 and engaged at an end thereof with the top end of first shaft portion 20*a*. More specifically, a downwardly opened notch 20*d* is formed on the end portion of second shaft portion 20*b*, and an escaping prevention pin 20*c* projects upward from the top end of first shaft portion 20*a* so as to be fitted into notch 20*d*, thereby engaging first and second shaft portions 20*a* and 20*b* with each other at the junction of the horizontal hole and the vertical recess in bearing block 28.

In this way, vertical first shaft portion 20*a* and horizontal second shaft portion 20*b* are joined to each other in bearing block 28 so as to constitute L-shaped counter shaft 20.

As shown in FIGS. 2 and 6, second shaft portion 20*b* is horizontally extended from bearing block 28. An upper shaft support portion 1*s* is extended downward from the ceiling portion of upper housing part 1*a*, and a lower shaft support portion 1*t* is extended upward from the bottom portion of lower housing part 1*b*, so that a tip of the portion of second shaft portion 20*b* horizontally extended from bearing block 28 is nipped between upper and lower shaft support portions 1*s* and 1*t*. A bevel gear 25, a final pinion 26 and a washer 26*a* are provided on second shaft portion 20*b* between bearing block 28 and upper and lower shaft support portions 1*s* and 1*t*. Bevel gear 25 slidably and relatively rotatably abuts against bearing block 28 and relatively unrotatably engages with final pinion 26. Washer 26*a* is sandwiched between final pinion 26 an upper and lower shaft support portions 1*s* and 1*t*. Therefore, bearing block 28, upper and lower shaft support portions 1*s* and 1*t* and washer 26*a* define the position of bevel gear 25 and final pinion 26 on second shaft portion 20*b*.

Bevel gear 25 meshes with bevel gear 24 on first shaft portion 20*a* as shown in FIG. 6, and final pinion 26 meshes with final gear 27 as shown in FIG. 2, so as to constitute deceleration gear train 3 from motor output gear 22 to final gear 27.

Motor output gear 22 fixed on motor shaft 21 and counter gear 23 meshing with motor output gear 22 are disposed below center section 18, however, gears 22 and 23 are horizontally flat and vertically short, so as to vertically minimize the portion of transaxle T below center section 18. Further, axle 4 is disposed higher than center section 18 so as to promote the vertical minimization of transaxle T. Final gear 27 on axle 4 and final pinion 26 meshing with final gear 27 are flat gears which can be easily manufactured. The driving connection between counter gear 23 lower than center section 18 and final pinion 26 higher than center section 18 is ensured by L-shaped counter shaft 20 and bevel gears 24 and 25 disposed on L-shaped counter shaft 20. Brake 30 will be described with reference to FIGS. 2, 6, 10 and 11. A vertical penetrating hole 1*x* is formed in a ceiling portion of upper housing part 1*a*, and a columnar second brake shaft portion 1*r* projects upward from a bottom portion of lower housing part 1*b* opposite to vertical penetrating hole 1*x*. A vertical brake shaft 33 is rotatably passed through penetrating hole 1*x*, and disposed coaxially to second brake shaft portion 1*r*. A brake arm 31 is fixed on a top of brake shaft 33 above upper housing part 1*a*, and hooked by a returning spring 32. Brake arm 31 is switchable between a braking position and an unbraking position. The biasing force of spring 32 returns brake arm 31 and brake shaft 33 to the unbraking position when brake arm 31 disposed at the braking position is released from an operation force.

In housing 1, an engaging projection 33*a* projects downward from the bottom end of brake shaft 33, and is fitted into a recess 34a formed at a top of a swingable block 34, so as to relatively unrotatably engage swingable block 34 with brake shaft 33. Namely, while brake shaft 33 is rotatable centered on the axis thereof, swingable block 34 is rotatable together with brake shaft 33. Second brake shaft portion 1r is relatively rotatably fitted into a later-discussed penetrating hole 34c in swingable block 34, so as to serve as a pivot shaft for supporting a bottom portion of swingable block 34.

Swingable block 34 is a substantially sideways U-shaped member including a vertical portion extended substantially vertically, an upper horizontal portion extended from a top of the vertical portion, and a lower horizontal portion extended from a bottom of the vertical portion. The vertical portion of swingable block 34 is disposed adjacent to counter gear 23, the upper horizontal portion of swingable block 34 is disposed above counter gear 23, and the lower horizontal portion of swingable block 34 is disposed below counter gear 23. Vertical penetrating hole 34c, into which second brake shaft portion 1r is inserted, is formed in the lower horizontal portion of swingable block 34. A downwardly opened vertical circular recess 34b is formed in the upper horizontal portion of swingable block 34 so as to be disposed coaxially to penetrating hole 34c.

An upper brake shoe 35 is disposed between the upper horizontal portion of swingable block 34 and counter gear 23. A columnar pivot portion 35b projects upward from brake shoe 35 so as to be relatively rotatably and axially slidably fitted into recess 34b. On the other hand, a lower brake shoe 36 is disposed between the lower horizontal portion of swingable block 34 and counter gear 23. A columnar pivot portion 36b projects downward from brake shoe 36 so as to be relatively rotatably and axially slidably fitted into hole 34c. Further, upper housing part 1a is formed with upwardly projecting stoppers along end portions of brake shoes 35 and 36 so as to prevent rotation of brake shoes 35 and 36. Due to the arrangement of brake shoes 35 and 36, pivot portions 35b and 36b are disposed coaxially to brake shaft 33 and second brake shaft portion 1r, so that brake shoes 35 and 36, held by stoppers 1v and 1w to be prevented from being horizontally rotated, do not prevent horizontal rotation of brake shaft 33 and swingable block 34.

A pair of cam portions 35a and 35a project upward from respective opposite sides of brake shoe 35 with respect to pivot portion 35b. A pair of cam portions 36a and 36a project downward from respective opposite sides of brake shoe 36 with respect to pivot portion 36b. When brake arm 31, brake shaft 33 and swingable block 34 are disposed at the unbraking position, cam portions 35a are engaged into a cam groove 34d formed at a bottom of the upper horizontal portion of swingable block 34, and cam portions 36a are engaged into a cam groove 34e formed at a top of the lower horizontal portion of swingable block 34, so that brake shoes 35 and 36 are separated from counter gear 23.

When brake arm 31, brake shaft 33 and swingable block 34 are rotated to the braking position, cam portions 35a are removed from cam groove 34d, and cam portions 36a are removed from cam groove 34e. Due to the axial slidability of pivot portion 35b in recess 34b, cam portions 35a removed from cam groove 34d are pressed downward by the upper horizontal portion of swingable block 34, so that brake shoe 35 is lowered and pressed against a top surface of counter gear 23. Simultaneously, due to the axial slidability of pivot portion 36b in hole 34c, cam portions 36b removed from cam groove 34e are pressed upward by the lower horizontal portion of swingable block 34, so that brake shoe 36 is raised and pressed against the bottom surface of counter gear 23. In this way, counter gear 23 is pressed and braked between upper and lower brake shoes 35 and 36, so as to brake axle 4.

It is further understood by those skilled in the art that the foregoing description is a preferred embodiment of the disclosed apparatus and that various changes and modifications may be made in the invention without departing from the spirit and scope thereof defined by the following claims.

INDUSTRIAL APPLICABILITY

The present hydrostatic transaxle is especially adaptable to a vehicle equipped with a pair of HSTs for driving respective left and right axles. Due to the compactness, the present invention hydrostatic transaxle is available to a small size vehicle such as a pedestrian-controlled lawn mower.

What is claimed is:

1. A hydrostatic transaxle comprising:
   an axle;
   a housing supporting the axle;
   a center section disposed in the housing;
   a variable displacement hydraulic pump mounted on the center section in the housing;
   a hydraulic motor for driving the axle, the hydraulic motor being mounted on the center section in the housing so as to be fluidly connected to the hydraulic pump through a fluid circuit formed in the center section; and
   an operation shaft for controlling the displacement of the hydraulic pump, wherein the operation shaft is pivotally supported by the housing and the center section.

2. The hydrostatic transaxle according to claim 1, further comprising:
   first and second divisional parts joined to each other so as to constitute the housing, wherein the operation shaft is supported by the center section and one of the first and second divisional parts.

3. The hydrostatic transaxle according to claim 1, further comprising:
   a pump shaft of the hydraulic pump extended parallel to the operation shaft, and pivotally supported by the housing and the center section.

4. The hydrostatic transaxle according to claim 3, further comprising:
   a motor shaft of the hydraulic motor extended parallel to the pump shaft and the operation shaft so as to be drivingly connected to the axle, wherein the hydraulic pump and the hydraulic motor are juxtaposed in the axial direction of the axle.

5. The hydrostatic transaxle according to claim 3, wherein the operation shaft is disposed between the pump shaft and the axle in a direction perpendicular to the axle.

* * * * *